United States Patent
Huh et al.

(10) Patent No.: US 7,706,223 B2
(45) Date of Patent: Apr. 27, 2010

(54) APPARATUS FOR AND METHOD OF DETECTING A WOBBLE SIGNAL IN ACCORDANCE WITH A TIME SHIFT

(75) Inventors: Jun-ho Huh, Yongin-si (KR); Je-kook Kim, Yongin-si (KR); Sang-hoon Moon, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 939 days.

(21) Appl. No.: 11/491,253

(22) Filed: Jul. 24, 2006

(65) Prior Publication Data

US 2007/0025202 A1 Feb. 1, 2007

(30) Foreign Application Priority Data

Jul. 29, 2005 (KR) ...................... 10-2005-0069663

(51) Int. Cl.
*G11B 15/52* (2006.01)
(52) U.S. Cl. ............... 369/47.31; 369/47.54; 369/53.34
(58) Field of Classification Search ....................... None
See application file for complete search history.

(56) References Cited

U.S. PATENT DOCUMENTS 4,062,047 A * 12/1977 Scull ............................ 360/26

| 2003/0002866 | A1* | 1/2003 | Owa et al. ................ 369/275.1 |
| 2004/0145981 | A1 | 7/2004 | Mashimo |
| 2004/0174800 | A1* | 9/2004 | Heemskerk et al. ......... 369/125 |
| 2005/0002304 | A1* | 1/2005 | Lo et al. ................... 369/59.17 |
| 2005/0047296 | A1 | 3/2005 | Georgi |
| 2007/0086298 | A1* | 4/2007 | Tanaka ..................... 369/44.13 |

FOREIGN PATENT DOCUMENTS

| EP | 1 489 612 | 12/2004 |
| JP | 2005-071579 | 3/2005 |
| KR | 2003-0089228 | 11/2003 |
| KR | 2004-0066714 | 7/2004 |
| KR | 2004-0111044 | 12/2004 |

* cited by examiner

*Primary Examiner*—Hoa T Nguyen
*Assistant Examiner*—Jesse Hauck
(74) *Attorney, Agent, or Firm*—Lee & Morse, P.C.

(57) ABSTRACT

An apparatus for and a method of detecting a wobble signal in accordance with a time shift includes comparing a basic wobble signal with reference levels to detect pulses representing the time shift in an analog fashion, and digitally determining a code value for the basic wobble signal on the basis of the widths of the pulses using a channel clock signal and a wobble clock signal. The determined code value is accumulated and serves as a basis on which final wobble data is produced.

17 Claims, 5 Drawing Sheets

APPARATUS FOR AND METHOD OF DETECTING A WOBBLE SIGNAL IN ACCORDANCE WITH A TIME SHIFT

BACKGROUND OF THE INVENTION

1. Field of the Invention

The present invention relates to an optical disk drive or an optical disk recording/reproducing system. More particularly, the present invention relates to an apparatus for and a method of detecting a wobble signal, e.g., a harmonic modulated wobble (HMW) signal, in accordance with a time shift in an optical disk drive, e.g., a blue-ray disk (BD) drive.

2. Description of the Related Art

Blue-ray disks (BDs), which are used in general digital broadcasting, can store a significantly large amount of data compared with laser optical disks, for example, compact disks (CDs) or digital versatile disks (DVDs). In particular, an optical disk drive should be able to detect HMWs from a BD, land pre-pits (LPPs) from a DVD-read only memory (DVD-ROM), addresses in pre-grooves (ADIP) from a DVD recordable and rewritable (DVD+R/RW), and complementary allocated pit addressing (CAPA) from a DVD random access memory (DVD-RAM) to obtain an address, i.e., track position information, required to record information onto a blank disk.

FIG. 1 illustrates wobble information recorded to a general BD. Referring to FIG. 1, a track of the BD may be divided into a monotone unit, a reference unit, a synchronization unit including sync_0 through sync_3 units, and a data unit including a data_0 unit and a data_1 unit according to a minimum shift keying (MSK)-cosine variant and a HMW method. Each unit may include a MSK mark, a monotone wobble, a sawtooth wobble representing "0", and a sawtooth wobble representing "1". Each wobble in the BD may have a period of 69 T, where T is a channel clock signal.

FIG. 2 illustrates a block diagram of a general BD drive 200. Referring to FIG. 2, the BD drive 200 may include a spindle motor 210, a sled motor 220, a pickup apparatus 230, a servo control unit 240, a recording and reproducing unit 250, a wobble signal detection unit 260, and a system controller 270.

A BD may be provided on a rotational shaft of the spindle motor 210 and rotates. The pickup apparatus 230 may read data from the BD or write encoded data to the BD under the control of the servo control unit 240. The servo control unit 240 may drive a tracking actuator (not shown) and a focusing actuator (not shown) which may be included in the pickup actuator 230. The system controller 270 may control the spindle motor 210, the sled motor 220 and the servo control unit 240 to achieve tracking control.

Audio or video data may be recorded in numerous forms, e.g., pits or spiral tracks of the BD having a structure as shown in FIG. 1. During reproduction, an optical device included in the pickup apparatus 230 may follow the spiral tracks and may produce a radio frequency (RF) signal RFO from data recorded on the BD. During recording, the pickup apparatus 230 may receive encoded data from the recording and reproducing unit 250, process the encoded data and record the processed data on the tracks of the BD, e.g., as pits. The system controller 270 may transmit data decoded by the recording and reproducing unit 250 to a postprocessor or data received from the postprocessor to the recording and reproducing unit 250.

The wobble signal detection unit 260 may process the RF signal RFO produced by the pickup apparatus 230 to generate a wobble signal WOBB, which is unique for each disk. When data is recorded to a blank disk, the wobble signal WOBB is used as accurate address information about a track currently being followed. The wobble signal WOBB may be provided to the system controller 270 and may serve as a base signal for producing a timing clock signal used to control the spindle motor 210, the sled motor 220 and the servo control unit 240. The wobble signal WOBB may also be used in executing ADIP.

A wobble detected from the BD may have the shape shown in FIG. 3. Referring to FIG. 3, a monotone wobble signal 31 may have a "$\cos\{2\pi(f_w)t\}$" waveform. A sawtooth wobble 32 representing "1" may temporally lead the monotone wobble signal 31 and has a "$\cos\{2\pi(f_w)t\}+a^*\sin\{2\pi(2f_w)t\}$" waveform. A sawtooth wobble 33 representing "0" may temporally lag the monotone wobble signal 31 and has a "$\cos\{2\pi(f_w)t\}-a^*\sin\{2\pi(2f_w)t\}$" waveform. Here, $f_w$ is a wobble frequency and "a" may be a constant smaller than 0.5.

Conventionally, to obtain "0" or "1" from the sawtooth wobbles 32 and 33, a difference between the amplitudes of the sawtooth wobbles 32 and 33, and the amplitude of the monotone wobble signal 31 has been used. To achieve this, the RF signal RFO produced by the pickup apparatus 230 may be sampled periodically, the sampled RF signal RFO may be converted into a digital signal, and a code for a sawtooth wobble may be determined according to a current sampled value of the digital signal. However, the wobble frequency $f_w$ has 956.52 kHz at a 1×speed. The above-described conventional determination requires a high-speed analog-to-digital converter (ADC) and cannot resolve data for speeds over a range from a low speed to a high speed.

SUMMARY OF THE INVENTION

The present invention is therefore directed to an apparatus for and method of detecting wobble coded on an optical disk, which substantially overcome one or more of the problems due to the limitations and disadvantages of the related art.

It is therefore a feature of an embodiment of the present invention to provide a wobble signal detector which detects a wobble signal coded on an optical disk in accordance with a time shift of the wobble signal.

It is therefore another feature of an embodiment of the present invention to provide a method of detecting a wobble signal by comparing an input wobble with a reference to determinate a code value according to a time shift of the input wobble.

At least one of the above and other features and advantages of the present invention may be realized by providing a wobble signal detector for an optical disk drive, the wobble signal detector including a first comparator converting an input wobble signal into a digital wobble signal, a phase-locked loop receiving the digital wobble signal and generating a channel clock signal and a wobble clock signal, frequencies of which are locked, and a code determination unit determining a time shift of the input wobble signal by comparing the input wobble signal with a reference level and determining a code value of the input wobble signal using the channel and wobble clock signals and the time shift of the input wobble signal.

The reference level may be set to at least 70% of a peak-to-peak level of the input wobble signal. The channel clock signal may have a frequency 69 times larger than a frequency of the wobble clock signal. An optical disk driven by the optical disk drive may be a disk having a harmonic modulated wobble (HMW).

The code determination unit may include an analog processing unit comparing the input wobble signal with the reference level to detect a pulse representing the time shift and a digital processing unit determining the code value of the input wobble signal on the basis of a width of the pulse using the channel clock signal and the wobble clock signal.

The wobble signal detector may further include an accumulator accumulating the code value in synchronization with the wobble clock signal and a second comparator comparing a result of the accumulation with a reference value and outputting a result of the comparison as final wobble data.

The analog processing unit may detect a first pulse representing the time shift of a peak side of the input wobble signal and a second pulse representing the time shift of a bottom side of the input wobble signal. The digital processing unit may determine the code value of the input wobble signal on the basis of widths of the first and second pulses.

The analog processing unit may include a peak detector detecting a peak level of the input wobble signal, a bottom detector detecting a bottom level of the input wobble signal, a pair of first resistors connected in series between an output of the peak detector and a power source, a pair of second resistors connected in series between an output of the bottom detector and the power source, a first comparator comparing the input wobble signal with a signal between the first pair of resistors to produce the first pulse, and a second comparator comparing the input wobble signal with a signal between the second pair of resistors to produce the second pulse.

The digital processing unit may include a divider producing a first clock signal and a second clock signal from the channel clock signal, wherein each of the first and second clock signals are of an opposite phase and identical frequency relative to the input wobble signal, a first logic gate performing a logic operation on the first clock signal and the first pulse, a second logic gate performing a logic operation on the second clock signal and the second pulse, a first counter counting a pulse width of the output of the first logic gate using the channel clock signal to produce a first count value, a second counter counting a pulse width of the output of the second logic gate using the channel clock signal to produce a second count value, and a subtractor subtracting the second count value from the first count value in synchronization with the wobble clock signal and generating a code value for the input wobble signal according to a result of the subtraction.

At least one of the above and other features and advantages of the present invention may be realized by providing a wobble signal detecting method performed in an optical disk drive, the method including converting an input wobble signal into a digital wobble signal, generating a channel clock signal and a wobble clock signal, frequencies of which are constantly locked, based on the digital wobble signal, determining a time shift of the input wobble signal by comparing the input wobble signal with a reference level, and determining a code value of the input wobble signal using the channel and wobble clock signals and the time shift of the input wobble signal.

The method may include detecting a signal with a predetermined frequency band corresponding to a wobble of an optical disk from a radio frequency (RF) signal picked up by an optical pickup apparatus to generate the input wobble signal.

The reference level may be set to at least 70% of a peak-to-peak level of the input wobble signal. The channel clock signal may have a frequency 69 times larger than a frequency of the wobble clock signal. The optical disk may have a harmonic modulated wobble (HMW).

The determining of the time shift may include processing the input wobble signal in an analog fashion and detecting a pulse representing the time shift according to a result of the comparison between the input wobble signal and the reference level. The determining of the code value may include digitally processing a width of the pulse using the channel clock signal and the wobble clock signal.

The method may include accumulating the code value in synchronization with the wobble clock signal, comparing a result of the accumulation with a reference value, and outputting a result of the comparison as final wobble data.

The determining of the time shift of the input wobble signal may include detecting a first pulse representing a time shift of a peak side of the input wobble signal and detecting a second pulse representing a time shift of a bottom side of the input wobble signal. The determining of the code value may include determining the code value of the input wobble signal on the basis of widths of the first and second pulses.

The determining of the time shift of the input wobble signal may include detecting a peak level of the input wobble signal, detecting a bottom level of the input wobble signal, generating a first reference level in between the peak level and a power source, generating a second reference level in between the bottom level and the power source, comparing the input wobble signal with the first reference level to produce the first pulse, and comparing the input wobble signal with the second reference level to produce the second pulse.

The determining of the code value may include producing a first clock signal and a second clock signal from the channel clock signal, wherein each of the first and second clock signals have an opposite phase and identical frequency relative to the input wobble signal, performing a first logical operation on the first clock signal and the first pulse, performing a second logical operation on the second clock signal and the second pulse, counting a pulse width of a result of the first logical operation using the channel clock signal to produce a first count value, counting a pulse width of a result of the second logical operation using the channel clock signal to produce a second count value, and subtracting the second count value from the first count value in synchronization with the wobble clock signal and generating a code value for the input wobble signal according to a result of the subtraction.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
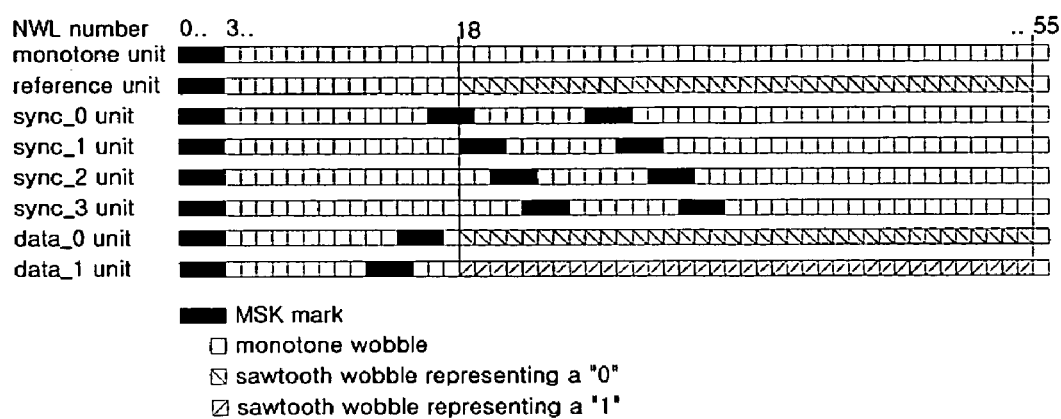
FIG. 1 illustrates wobble information recorded to a general blue-ray disk (BD)

Korean Patent Application No. 10-2005-0069663, filed on Jul. 29, 2005, in the Korean Intellectual Property Office, and entitled: "Apparatus for and Method of Detecting Harmonic Modulated Wobble Signal Using Amount of Time Shift In Blue-Ray Disk Drive," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 2:
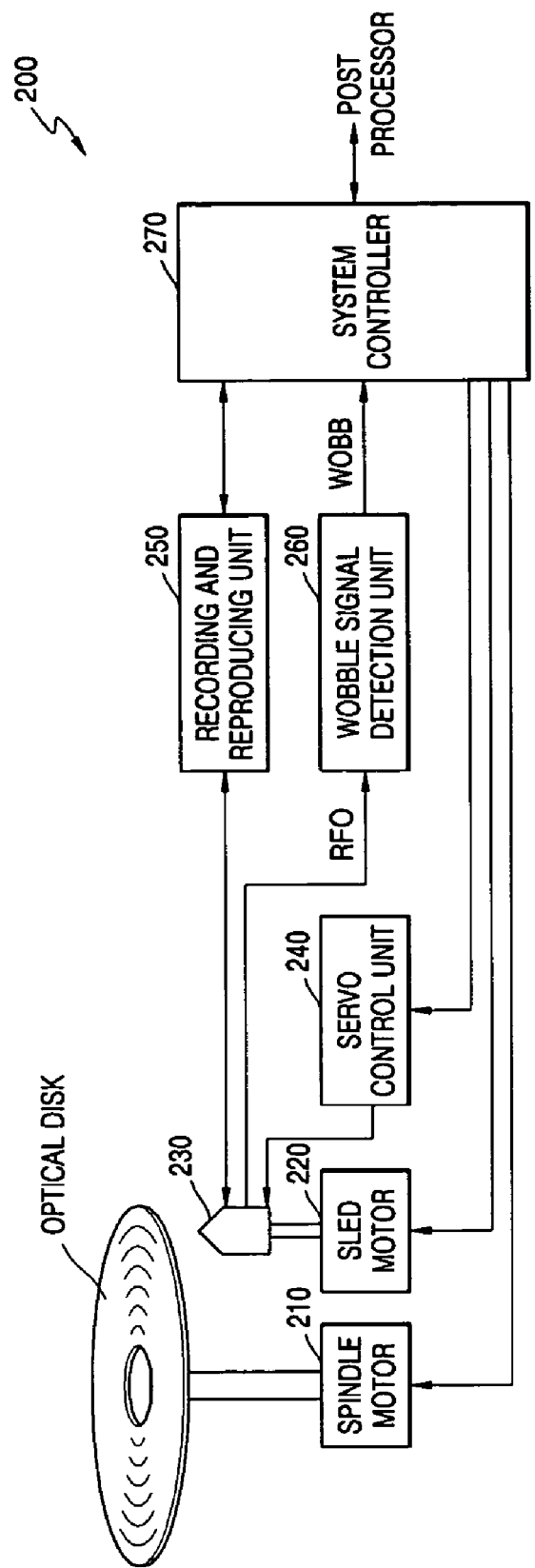
FIG. 2 illustrates a block diagram of a general BD drive.
Figure 4:
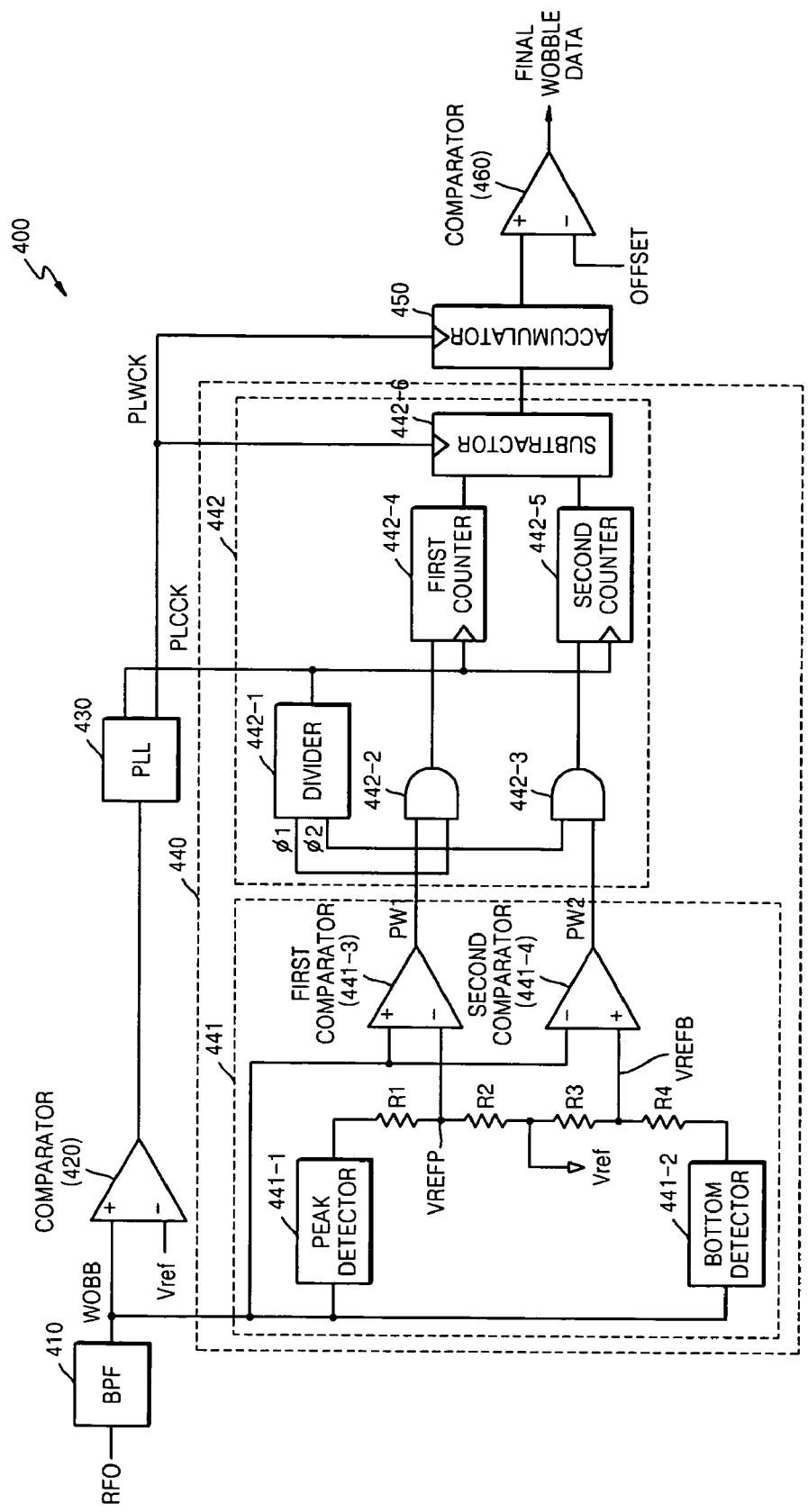
FIG. 4 illustrates a block diagram of a wobble signal detector according to an embodiment of the present invention.

FIG. 4 illustrates a block diagram of a wobble signal detector 400 according to an embodiment of the present invention which may be included in an optical disk drive as shown in FIG. 2. Referring to FIG. 4, the wobble signal detector 400 may include a band pass filter (BPF) 410, a comparator 420, a phase-locked loop (PLL) 430, a code determination unit 440, an accumulator 450 and a comparator 460.

The BPF 410 may remove noise from an RF signal RFO picked up by the pickup apparatus 230 of FIG. 2 and may detect a signal with a predetermined frequency band corresponding to a wobble of the BD of FIG. 2 to generate the basic wobble signal WOBB. The comparator 420 may compare the basic wobble signal WOBB with a reference value VREF to convert the basic wobble signal WOBB into a binary digital signal. If the basic wobble signal WOBB is larger than the reference value VREF, the comparator 420 may output a logic high signal; otherwise, the comparator 420 may output a logic low signal. The PLL 430 may produce a channel clock signal PLCCK and a wobble clock signal PLWCK, frequencies of which being constantly locked, according an output signal of the comparator 420. For example, the channel clock signal PLCCK may have a frequency sixty-nine (69) times greater than the frequency of the wobble clock signal PLWCK. For example, the channel clock signal PLCCK may have a 66 MHz frequency at a 1×speed.

Figure 3:
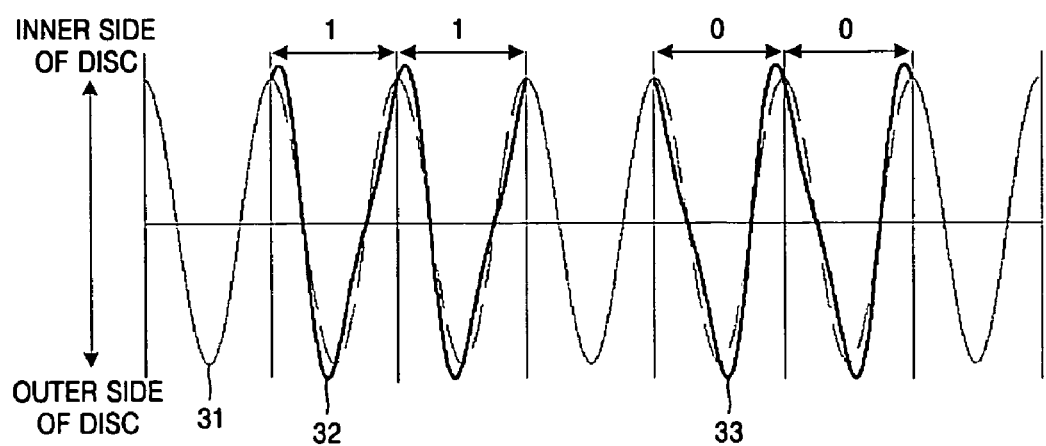
FIG. 3 illustrates a shape in which a wobble signal is detected.

The code determination unit 440 may determine a code value of the basic wobble signal WOBB without using an ADC. In other words, to obtain "0" or "1" from the sawtooth wobbles 32 and 33 shown in FIG. 3, the code determination unit 440 may compare the basic wobble signal WOBB with reference levels VREFP and VREFB, and may determine a time shift in an analog fashion, i.e., determines whether the basic wobble signal WOBB leads or lags a monotone wobble. On the basis of this determination, the code determination unit 440 may determine the code value of the basic wobble signal WOBB.

The accumulator 450 may accumulate the code values determined by the code determination unit 440 in synchronization with the wobble clock signal PLWCK produced by the PLL 430. The comparator 460 may compare a result of the accumulation with a reference value OFFSET and may output a result of the comparison, e.g., logic low or logic high, as final wobble data. The final wobble data may be used as position information about a track of the BD that is being followed by the system controller 270 of FIG. 3. The final wobble data may serve as a basic signal used to produce a timing clock signal required for recording.

The code determination unit 440 may include an analog processing unit 441 and a digital processing unit 442. The analog processing unit 441 may compare the basic wobble signal WOBB with the reference levels VREFP and VREFB to detect a pulse representing a direction of the time shift. The digital processing unit 442 may determine the code value of the basic wobble signal WOBB on the basis of the width of the pulse.

The analog processing unit 441 may include a peak detector 441-1, a bottom detector 441-2, a first pair of resistors R1 and R2 connected in series between an output of the peak detector 441-1 and a power source Vref, a second pair of resistors R3 and R4 connected in series between an output of the bottom detector 441-2 and the power source Vref, a first comparator 441-3, and a second comparator 441-4. The power source Vref may be the same as the reference level VREF of the comparator 420.

Figure 5:
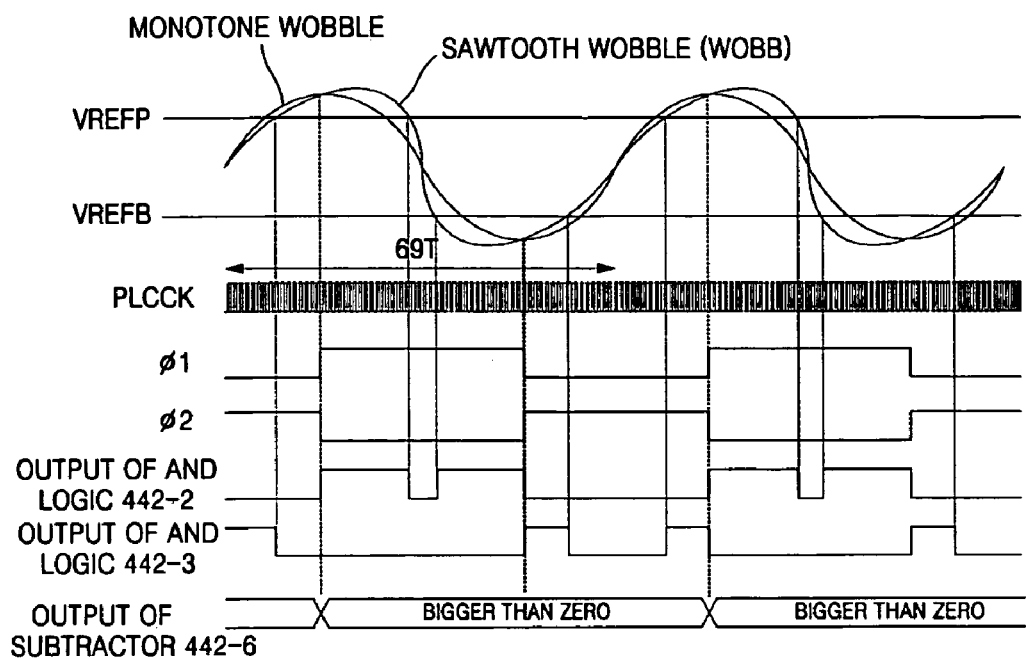
FIG. 5 illustrates a waveform diagram of signals of the wobble signal detector of FIG. 4 to explain an operation for detecting "1"
Figure 6:
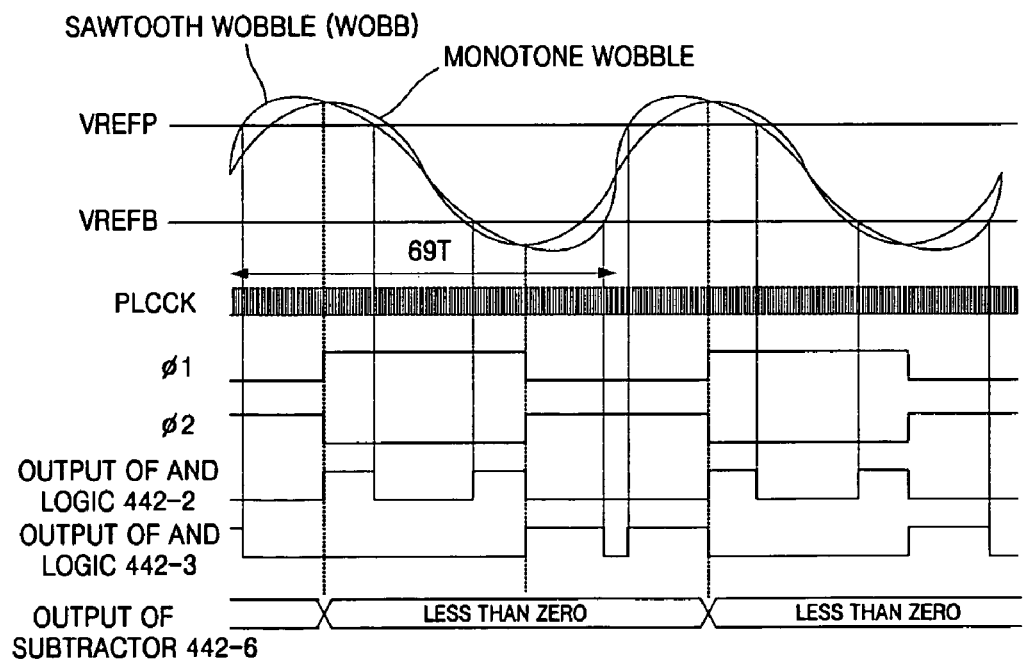
FIG. 6 illustrates a waveform diagram of signals of the wobble signal detector of FIG. 4 to explain an operation for detecting "0".

The peak detector 441-1 may detect a maximum of the basic wobble signal WOBB output by the BPF 410. The bottom detector 441-2 may detect a minimum of the basic wobble signal WOBB. Thus, as shown in FIGS. 5 and 6, the first and second reference levels VREFP and VREFB may be set in accordance with the detected maximum and minimum of the basic wobble signal WOBB. The first reference level VREFP may be set to about 70-80% of the maximum of the basic wobble signal WOBB. The second reference level VREFB may be set to about 70-80% of the minimum of the basic wobble signal WOBB. For example, when the values of the resistors R1 and R2 connected in series between the output of the peak detector 441-1 and the power source Vref are appropriately determined, the first reference level VREFP may have a direct current (DC) level corresponding to about 70-80% of the maximum detected by the peak detector 441-1 (see FIGS. 5 and 6) as in Equation 1:

$$VREFP = VREF + R2/(R1+R2) \quad (1)$$

When the values of the resistors R3 and R4 connected in series between the output of the bottom detector 441-2 and the power source Vref are appropriately determined, the second reference level VREFB may have a DC level corresponding to about 70-80% of the minimum detected by the bottom detector 441-2 as in Equation 2:

$$VREFB = VREF - R3/(R4+R3) \quad (2)$$

The first comparator 441-3 may compare the basic wobble signal WOBB output by the BPF 410 with the first reference level VREFP to produce a first pulse PW1 depending upon the result of the comparison. For example, if the basic wobble signal WOBB is greater than the first reference level VREFP, the first pulse PW1 may be logic high; otherwise, the first pulse PW1 may be logic low. The second comparator 441-4 compares the basic wobble signal WOBB with the second reference level VREFB to produce a second pulse PW2 depending upon the result of the comparison. For example, if the basic wobble signal WOBB is less than the second reference level VREFB, the second pulse PW2 may be logic high; otherwise, the second pulse PW2 may be logic low.

Thus, the analog processing unit 441 may detect the first pulse PW1 representing the time shift of the peak side of the basic wobble signal WOBB and the second pulse PW2 representing the time shift of the bottom side of the basic wobble signal WOBB. When the resistor values of Equation 1 are set appropriately, if the basic wobble signal WOBB leads the monotone wobble, the first pulse PW1 has a wide logic high period. Otherwise, the first pulse PW1 has a narrow logic high period. FIGS. 5 and 6 show outputs of the first AND gate 442-2 and the second AND gate 442-3 depending on the first and second pulses PW1 and PW2, respectively.

The digital processing unit 442 may include a divider 442-1, the first and second AND gates 442-2 and 442-3, a first counter 442-4, a second counter 442-5, and a subtractor 442-6.

The divider 442-1 may produce a first clock signal φ1 and a second clock signal φ2 from the channel clock signal PLCCK output from the PLL 430. The first and second clock signals φ1 and φ2 may have opposite phases and frequencies identical to the frequency of the basic wobble signal WOBB.

The first AND gate 442-2 may perform an AND operation on the first clock signal φ1 and the first pulse PW1. The second AND gate 442-3 may perform an AND operation on the second clock signal φ2 and the second pulse PW2. When the basic wobble signal WOBB leads the monotone wobble, as shown in FIG. 5, the output of the first AND logic 442-2 may have period wider than that of the output of the second AND logic 442-3. When the basic wobble signal WOBB lags the monotone wobble, as shown in FIG. 6, the output of the first AND logic 442-2 may have a period narrower than that of the output of the second AND logic 442-3.

The first counter 442-4 may count a pulse width of the output of the first AND logic 442-2 using the channel clock signal PLCCK to produce a first count value. The second counter 442-5 may count a pulse width of the output of the second AND logic 442-3 using the channel clock signal PLCCK to produce a second count value.

The subtractor 442-6 may subtract the second count value from the first count value in synchronization with the wobble clock signal produced by the PLL 430. If a result of the subtraction is greater than zero, the subtractor 442-6 may generate a logic high signal (i.e., a "1") as the code value of the basic wobble signal WOBB. If the result of the subtraction is less than zero, the subtractor 442-6 generates a logic low signal (i.e., a "0") as the code value of the basic wobble signal WOBB. When the basic wobble signal WOBB leads the monotone wobble, as shown in FIG. 5, the pulse width of the output of the first AND logic 442-2 may be greater than that of the output of the second AND logic 442-3, so that the subtractor 442-6 outputs "1". When the basic wobble signal WOBB lags the monotone wobble, as shown in FIG. 6, the pulse width of the output of the first AND logic 442-2 may be smaller than that of the output of the second AND logic 442-3, so that the subtractor 442-6 outputs "0".

As described above, the digital processing unit 442 determines the code value of the basic wobble signal WOBB based on the first and second pulses PW1 and PW2 in a digital fashion.

As described above, the code determination unit 440 of the wobble signal detector 400 may compare the basic wobble signal WOBB with the first and second reference levels VREFP and VREFB to detect the first and second pulses representing the time shift in an analog fashion, and may digitally determine a code value for the basic wobble signal WOBB on the basis of the widths of the pulses using the channel clock signal PLCCK and the wobble clock signal PLWCK. The determined code value may be accumulated and may serve as a basis on which the final wobble data is produced.

As described above, an optical disk drive according to the present invention determines a code value for an input wobble by comparing the input wobble having a certain waveform with respect to time with a reference level. Thus, a stable, accurate high-frequency wobble signal may be detected even without using a high-speed ADC for performing an amplitude comparison. Accordingly, precise tracking is possible, e.g., upon recording of information to a BD.

Exemplary embodiments of the present invention have been disclosed herein, and although specific terms are employed, they are used and are to be interpreted in a generic and descriptive sense only and not for purpose of limitation. For example, while AND gates are described above, other logic gates may be used in assessing the pulse widths. Accordingly, it will be understood by those of ordinary skill in the art that various changes in form and details may be made without departing from the spirit and scope of the present invention as set forth in the following claims.

What is claimed is:

1. A wobble signal detector for an optical disk drive, the wobble signal detector comprising:
    a first comparator converting an input wobble signal into a digital wobble signal;
    a phase-locked loop receiving the digital wobble signal and generating a channel clock signal and a wobble clock signal, frequencies of which are locked; and
    a code determination unit determining a time shift of the input wobble signal by comparing the input wobble signal with a reference level and determining a code value of the input wobble signal using the channel and wobble clock signals and the time shift of the input wobble signal, the code determination unit including:
        an analog processing unit comparing the input wobble signal with the reference level to detect a pulse representing the time shift, and
        a digital processing unit determining the code value of the input wobble signal on the basis of a width of the pulse using the channel clock signal and the wobble clock signal.

2. The wobble signal detector as claimed in claim 1, wherein the reference level is set to at least 70% of a peak-to-peak level of the input wobble signal.

3. The wobble signal detector as claimed in claim 1, wherein the channel clock signal has a frequency 69 times larger than a frequency of the wobble clock signal.

4. The wobble signal detector as claimed in claim 1, further comprising:
    an accumulator accumulating the code value in synchronization with the wobble clock signal; and
    a second comparator comparing a result of the accumulation with a reference value and outputting a result of the comparison as final wobble data.

5. The wobble signal detector as claimed in claim 1, wherein:
    the analog processing unit detects a first pulse representing the time shift of a peak side of the input wobble signal and a second pulse representing the time shift of a bottom side of the input wobble signal; and
    the digital processing unit determines the code value of the input wobble signal on the basis of widths of the first and second pulses.

6. The wobble signal detector as claimed in claim 5, wherein the analog processing unit comprises:
    a peak detector detecting a peak level of the input wobble signal;
    a bottom detector detecting a bottom level of the input wobble signal;
    a pair of first resistors connected in series between an output of the peak detector and a power source;
    a pair of second resistors connected in series between an output of the bottom detector and the power source;
    a first comparator comparing the input wobble signal with a signal between the first pair of resistors to produce the first pulse; and
    a second comparator comparing the input wobble signal with a signal between the second pair of resistors to produce the second pulse.

7. The wobble signal detector as claimed in claim 5, wherein the digital processing unit comprises:
    a divider producing a first clock signal and a second clock signal from the channel clock signal, each of the first and second clock signals being of an opposite phase and identical frequency relative to the input wobble signal;

a first logic gate performing a logic operation on the first clock signal and the first pulse;

a second logic gate performing a logic operation on the second clock signal and the second pulse;

a first counter counting a pulse width of the output of the first logic gate using the channel clock signal to produce a first count value;

a second counter counting a pulse width of the output of the second logic gate using the channel clock signal to produce a second count value; and a subtractor subtracting the second count value from the first count value in synchronization with the wobble clock signal and generating a code value for the input wobble signal according to a result of the subtraction.

8. The wobble signal detector as claimed in claim 1, wherein an optical disk driven by the optical disk drive is a disk having a harmonic modulated wobble (HMW).

9. A wobble signal detecting method performed in an optical disk drive, the method comprising:

converting an input wobble signal into a digital wobble signal;

generating a channel clock signal and a wobble clock signal, frequencies of which are constantly locked, based on the digital wobble signal;

determining a time shift of the input wobble signal by comparing the input wobble signal with a reference level, the determining of the time shift including processing the input wobble signal in an analog fashion and detecting a pulse representing the time shift according to a result of the comparison between the input wobble signal and the reference level; and determining a code value of the input wobble signal using the channel and wobble clock signals and the time shift of the input wobble signal, the determining of the code value including digitally processing a width of the pulse using the channel clock signal and the wobble clock signal.

10. The wobble signal detecting method as claimed in claim 9, further comprising detecting a signal with a predetermined frequency band corresponding to a wobble of an optical disk from a radio frequency (RF) signal picked up by an optical pickup apparatus to generate the input wobble signal.

11. The wobble signal detecting method as claimed in claim 9, wherein the reference level is set to at least 70% of a peak-to-peak level of the input wobble signal.

12. The wobble signal detecting method as claimed in claim 9, wherein the channel clock signal has a frequency 69 times larger than a frequency of the wobble clock signal.

13. The wobble signal detecting method as claimed in claim 9, further comprising:

accumulating the code value in synchronization with the wobble clock signal;

comparing a result of the accumulation with a reference value; and outputting a result of the comparison as final wobble data.

14. The wobble signal detecting method as claimed in claim 9, wherein:

the determining of the time shift of the input wobble signal includes:

detecting a first pulse representing a time shift of a peak side of the input wobble signal; and detecting a second pulse representing a time shift of a bottom side of the input wobble signal; and the determining of the code value includes determining the code value of the input wobble signal on the basis of widths of the first and second pulses.

15. The wobble signal detecting method as claimed in claim 14, wherein the determining of the time shift of the input wobble signal comprises:

detecting a peak level of the input wobble signal;

detecting a bottom level of the input wobble signal;

generating a first reference level in between the peak level and a power source;

generating a second reference level in between the bottom level and the power source;

comparing the input wobble signal with the first reference level to produce the first pulse; and comparing the input wobble signal with the second reference level to produce the second pulse.

16. The wobble signal detecting method as claimed in claim 14, wherein the determining of the code value comprises:

producing a first clock signal and a second clock signal from the channel clock signal, wherein each of the first and second clock signals have an opposite phase and identical frequency relative to the input wobble signal;

performing a first logical operation on the first clock signal and the first pulse;

performing a second logical operation on the second clock signal and the second pulse;

counting a pulse width of a result of the first logical operation using the channel clock signal to produce a first count value;

counting a pulse width of a result of the second logical operation using the channel clock signal to produce a second count value; and subtracting the second count value from the first count value in synchronization with the wobble clock signal and generating a code value for the input wobble signal according to a result of the subtraction.

17. The wobble signal detecting method as claimed in claim 9, wherein the optical disk has a harmonic modulated wobble (HMW).

* * * * *